E. F. DWYER.
NEEDLE-BARS AND TRIMMING-KNIVES FOR SEWING-MACHINES.

No. 185,899. Patented Jan. 2, 1877.

WITNESSES

INVENTOR

UNITED STATES PATENT OFFICE.

EDWARD F. DWYER, OF LYNN, MASSACHUSETTS.

IMPROVEMENT IN NEEDLE-BARS AND TRIMMING-KNIVES FOR SEWING-MACHINES.

Specification forming part of Letters Patent No. 185,899, dated January 2, 1877; application filed July 26, 1876.

*To all whom it may concern:*

Be it known that I, EDWARD F. DWYER, of Lynn, in the county of Essex and State of Massachusetts, have invented an Improved Needle-Bar and Trimming-Knife, of which the following is a specification:

The invention relates to a needle-bar and trimming-knife combined, and used in a sewing-machine for sewing and trimming leather-work; and consists of a hollow needle-bar, and in the hollow of said bar is a long knife-blank, to be used for trimming the leather-work while the sewing is being done.

Short bent knives, adjusted to the outside of needle-bars and bent so as to cut close to the sewing, have been used for the same purpose; but such knives are of short duration, and consequently are expensive.

My improvement consists in making one long knife-blank and combining the same with a hollow needle-bar, or needle-bar cut longitudinally for a straight knife-blank, and adjusting the same as hereinafter shown.

Instead of a solid bar, then, I have constructed a bar, hollow or cut longitudinally, except the part into which the needle is inserted, that part being solid, except the hole for the needle and the space or a furrow for the knife-blank through the solid part near the needle; and that others may better understand the nature and use of my invention, I will explain the same by the use of the accompanying drawing, which is made a part of this specification.

Figure 1:
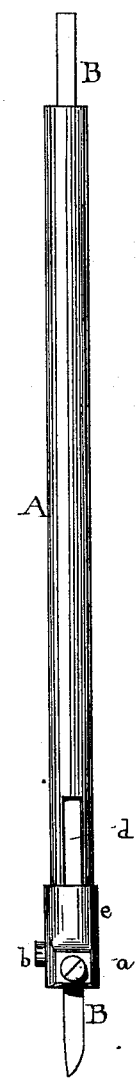
Figure 2:
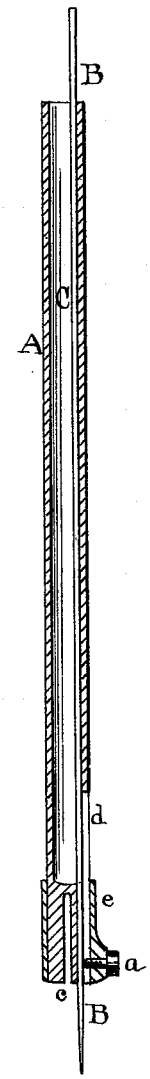

Figure 1 represents the needle-bar and the trimming knife, and part of the knife-blank, in elevation; and Fig. 2 is a longitudinal section of the same, in both of which figures the letter A represents the needle-bar; B, the trimming-knife or knife-blank; C, the hollow space in the bar; *a*, the screw to adjust the knife A; *b*, a screw to adjust the needle; *c*, the hole for the needle; *d*, a slot or furrow in the needle-bar; and *e*, a jacket about the lower end of the needle-bar.

Fig. 2 shows the hollow or cutting C of the needle-bar, and the solid part of the bar, into which the needle is inserted at *c*, and is adjusted by the screw, as seen at *b*, Fig. 1, and also the groove for the knife-blank.

I have placed a jacket, *e*, about the lower part of the needle-bar, though this need not be a necessity. The bar is slotted, as shown at *d*, Fig. 1, and the adjusting-screw *d* passes through the slot in the needle-bar, and bears upon the knife-blank, as shown in Fig. 2. As the knife becomes worn by use, the blank may pushed down or taken out and sharpe ed.

This form or construction of a knife-blank, and the mode of its adjustment to the needle-bar, and of keeping it in place, is superior to any knife now in use for this purpose.

Instead of making or cutting the needle-bar as shown in the drawing, I might make a furrow or groove in the needle-bar longitudinally for the knife blank, and secure said knife-blank by jackets and screws; but I prefer the hollow cutting in the needle-bar, as herein shown and described.

In the plate of the machine (not herein shown) there is a slot cut for the knife to pass through beside the hole for the needle in the same plate.

What I claim as my invention, and desire to secure by Letters Patent, is—

1. A needle-bar, A, cut longitudinally for the reception of the knife-blank B, substantially as shown, and for the purpose described.

2. The combination of the needle-bar A and the knife-blank B, substantially as shown, and for the purpose described.

EDWARD F. DWYER.

Witnesses:
WILLIAM FROST,
DAVID D. DONOVAN.